Patented Oct. 7, 1947

2,428,716

UNITED STATES PATENT OFFICE 2,428,716

METHOD OF COATING FABRIC WITH POLYVINYL CHLORIDE

John Heron McGill, Manchester, and Leslie Budworth Morgan, Baguley, England, assignors to Imperial Chemical Industries Limited, a corporation of Great Britain No Drawing. Application January 2, 1942, Serial No. 425,478. In Great Britain January 25, 1941

7 Claims. (Cl. 117—161)

1

This invention relates to the production of improved coatings on base materials and more particularly to the production of improved coatings of plasticized polyvinyl chloride on fabric supports.

It has already been proposed to coat or impregnate textile fabrics with polyvinyl chloride or water-insoluble mixed polymerisation products derived from polyvinyl chloride and a derivative of acrylic acid other than a salt thereof, by coating or impregnating the fabric with homogeneous aqueous suspensions of said polymeric materials, removing the water, and causing the particles of the polymeric materials to coalesce under the influence of heat and pressure. It has also been proposed to coat textile materials with polyvinyl compounds in conjunction with plasticizing agents by a surface application of hot, homogeneous pastes or rubber-like masses thereof, the coated materials being then allowed to cool.

We have now found that, in the production of fabric supports coated with polyvinyl chloride in conjunction with a plasticizing agent by applying, for example by spreading, a uniformly distributed mixture of polyvinyl chloride and a plasticizing agent on to the surface of the fabric support and then causing gelatinisation by heat, it is advantageous, prior to the application of the mixture, to apply a base coating of polyvinyl chloride and a plasticizing agent, said base coating being produced by coating or impregnating, for example by spreading, the fabric support with an aqueous dispersion containing polyvinyl chloride and a plasticizing agent and then removing the water. The application of this base coating prior to the application of the final or top coating not only enables the production of a top coating with satisfactory properties from less material than would otherwise be required, but results in the production of a coated fabric support with a surprisingly high anchorage between the coating and the fabric. Further, we have found that water-soluble thickening agents may be usefully added to the aqueous dispersions. The addition of these thickening agents facilitates the application of the aqueous dispersions as base coatings by means of a spreading technique as well as the production of coated fabrics with the excellent properties referred to above. At the same time, base coatings from aqueous dispersions containing these thickening agents are less friable than base coatings from aqueous dispersions containing no such thickening agent, and they have an increased resistance to degradation by rubbing.

According to the present invention, in the production of fabric supports coated with polyvinyl chloride in conjunction with a plasticizing agent by applying to the surface of the support

2 a uniformly distributed mixture of polyvinyl chloride and a plasticizing agent and then heating until gelatinisation is effected, we provide the improvement which comprises first coating or impregnating the fabric support with an aqueous dispersion containing polyvinyl chloride and a plasticizing agent, if desired together with a water-soluble thickening agent, and then removing the water.

As aqueous dispersions of polyvinyl chloride containing a plasticizing agent we may use a homogeneous dispersion such as is obtained by agitating and grinding polyvinyl chloride with water in a known manner, or a dispersion obtained by polymerising vinyl chloride in aqueous emulsion in known manner. The plasticizing agents may be added before, during or after the preparation of the dispersion. The water-soluble thickening agents, if used, are usually added after the preparation of the dispersion.

As uniformly distributed mixtures of polyvinyl chloride and a plasticizing agent there may be used, for example, those described in British specification No. 500,298.

As polyvinyl chlorides particularly suitable for present purposes there may be used high molecular weight polymerisation products, as for example products having a viscosity index (K-value) of more than 40 and preferably of about 60 (for K-value see Cellulose-chemie 1932, pp. 58 and 71). It is also to be understood that the term polyvinyl chloride as used herein shall include interpolymerisation products of vinyl chloride with other polymerisable materials, for example acrylic acid esters or other vinyl esters.

As plasticizing agents, suitable as components of the base or top coatings, there may be used any substantially non-volatile organic materials which are known to be useful for plasticizing polyvinyl chloride, and more especially those materials which are liquids at room temperatures. Mixtures of the organic materials may likewise be used. If it is desired to manufacture substantially non-inflammable coated fabrics, then it is preferred to use a chlorine- or other halogen-containing plasticizing agent. As examples of suitable plasticizing agents there may be mentioned esters of phosphoric, phthalic or benzoic acids, such as tricresyl phosphate, dibutyl phthalate or benzyl benzoate, or chlorinated hydrocarbons such as para-dichlorobenzene or chloronaphthalenes. For the aqueous dispersions to be applied as base coatings, it has been found useful to have present between 30 and 100 parts by weight of the plasticizing agent per 100 parts of polymer, and it has been found to be advantageous to have a proportion of the plasticizer present during the preparation of the dispersion. For the compositions to be applied as top coats, the proportion of plasticizing agent to the polymer may be higher, for example, it has been found that satisfactory coatings are obtained from 100 parts of plasticizing agent together with 100 parts of polymer.

Examples of water-soluble thickening agents are water-soluble cellulose ethers, for instance those ethers obtainable according to the method described in British specification No. 469,391, e. g. a water-soluble methyl-ethyl-cellulose, water-soluble gums such as gum tragacanth or gum arabic, and water-soluble polymeric materials such as polyvinyl alcohol, water-soluble partially-saponified polyvinyl acetate, or the sodium salt of a methacrylic acid-methyl methacrylate interpolymer. The proportions of the water-soluble thickening agents used are best determined by trial, that is to say, the proportions used are those found to give dispersions with a viscosity which makes them satisfactory for use on a spreading machine. Proportions of about 3% of a water-soluble methyl-ethyl cellulose, of about 1-2% of gum tragacanth and of about 3-4% of polyvinyl alcohol (based on the weight of the aqueous dispersion) have been found to be satisfactory.

In carrying the invention into effect, the aqueous dispersion is applied to the surface of the base cloth, using known technique, and the water is removed, for example, by hot-air drying. If desired, a mechanical finishing process may be included in and/or may follow the operation. It is advantageous to follow the base coating operation with a calendering, since such treatment enables the production of a top coating with a smoother surface. Similarly, the top coating may be applied in any convenient manner.

In addition to the polymeric material, the plasticizing agent and the thickening agent, the aqueous dispersion to be used for the production of the base coatings may contain other ingredients. These include emulsifying or dispersing agents, pigments or fillers, and heat stabilisers, for example, zinc or mercury or lead mercaptides, or 2:4-dihydroxyquinoline or metallic salts thereof. Likewise, these additional ingredients may be included in the compositions to be used in the production of the top coatings.

The invention is illustrated but not limited by the following examples, in which the parts are expressed by weight:

Example 1

To 100 parts of an aqueous dispersion of polyvinyl chloride (made by polymerising 30 parts of vinyl chloride in the presence of 3 parts of dibutyl phthalate in aqueous suspension) are added with high speed stirring 33 parts of a 10% aqueous solution of a water soluble methyl-ethyl-cellulose and 11 parts of dibutyl phthalate. The so obtained stiff paste is applied to the surface of a base cloth by means of a spreading machine, the coated cloth is dried and passed once through a calender at 30-40° C.

The so obtained coated cloth is given a top coat by spreading on to it a uniform paste of 30 parts of finely divided vinyl chloride, 30 parts of tricresyl phosphate and 30 parts of a pigment by means of a spreading machine, heating at 150° C. for a few minutes to completely gelatinise the top coat, and then allowing to cool. There is thus obtained a smooth, pigmented coating which is highly resistant to degradation by rubbing and which has an excellent anchorage to the base cloth.

A similar coated product is obtained by using for the base coating the composition described in the example except that it contains no thickening agent, but it is more difficult to spread the composition satisfactorily.

A similar coated material prepared without first applying the base coat has a rough surface and a coating which breaks down when the material is rubbed.

Example 2

To 100 parts of an aqueous dispersion of polyvinyl chloride (made by polymerising 30 parts of vinyl chloride in aqueous dispersion) are added 30 parts of tricresyl phosphate and 33 parts of a 5% aqueous solution of gum tragacanth.

The so obtained paste is applied as a coating on a base cloth, and the so coated cloth is given a top coat as described in Example 1. A similar product is obtained.

Example 3

To 100 parts of an aqueous dispersion of polyvinyl chloride are added 30 parts of a tricresyl phosphate and 33 parts of a 12% aqueous solution of polyvinyl alcohol.

The so obtained paste is applied as a coating on a base cloth and the so coated cloth is given a top coat as described in Example 1. A similar product is obtained.

We claim:

1. The process of preparing coated fabrics which comprises applying to a textile base fabric a composition containing an aqueous emulsion of polyvinyl chloride and from 30 to 100% thereof of a plasticising agent, removing the water from the coating and thereafter applying a composition containing polyvinyl chloride and a plasticising agent and heating the coated fabric until gelatinization is effected, the said polyvinyl chloride being essentially the sole resinous film-forming polymer in both compositions.

2. The process of claim 1 in which a water soluble cellulose ether is present as a thickening agent in the emulsion coat.

3. The process of claim 1 in which the aqueous emulsion has a viscosity index of about 40 to 60.

4. The process of claim 1 in which the fabric is calendered between the application of the two coats.

5. The process of claim 1 in which the second composition contains about equal parts of polyvinyl chloride and a solvent plasticizer and is subsequently heated after application at a temperature of about 150° C. for a few minutes.

6. The process of claim 1 in which the second coat contains about equal parts of polyvinyl chloride, plasticizing agent and pigment.

7. The process of claim 1 in which a plasticizing agent is present during the polymerization of the polyvinyl chloride in an aqueous emulsion.

JOHN HERON McGILL.
LESLIE BUDWORTH MORGAN.

REFERENCES CITED

The following references are of record in the file of this patent:

UNITED STATES PATENTS

| Number | Name | Date |
|---|---|---|
| 1,950,662 | Dreyfus | Mar. 13, 1934 |
| 2,171,389 | Cate | Aug. 29, 1939 |
| 2,204,520 | Walker | June 11, 1940 |
| 1,933,052 | Fikentscher | Oct. 31, 1933 |
| 2,302,557 | Langkammerer | Nov. 17, 1942 |